E. W. SMITH, C. D. GALLOWAY AND C. AMBRUSTER.
STORAGE BATTERY PLATE OR ELECTRODE.
APPLICATION FILED SEPT. 4, 1918.

1,374,477.  Patented Apr. 12, 1921.

WITNESS:
Rob't R. Kitchel

INVENTORS
Edward Wanton Smith
Charles D. Galloway &
Cornelius Ambruster
BY
Augustus B. Stoughton,
ATTORNEY.

UNITED STATES PATENT OFFICE.

EDWARD WANTON SMITH, OF PHILADELPHIA, AND CHARLES D. GALLOWAY AND CORNELIUS AMBRUSTER, OF ROSLYN, PENNSYLVANIA.

STORAGE-BATTERY PLATE OR ELECTRODE.

1,374,477.

Specification of Letters Patent.   Patented Apr. 12, 1921.

Application filed September 4, 1918.   Serial No. 252,564.

*To all whom it may concern:*

Be it known that we, EDWARD WANTON SMITH, CHARLES D. GALLOWAY, and CORNELIUS AMBRUSTER, all citizens of the United States, respectively residing at Philadelphia, in the county of Philadelphia, and the latter two at Roslyn, Montgomery county, and State of Pennsylvania, their common post-office address being 19th street and Allegheny Ave., Philadelphia, Pennsylvania, have jointly invented certain new and useful Improvements in Storage-Battery Plates or Electrodes, of which the following is a specification.

Our invention relates to plates or electrodes which include metallic rods surrounded by active material or material adapted to become active inclosed in ribbed and perforated or slotted tubes, and the invention consists in an improved end construction which will be presently described and finally claimed.

Objects of the invention are to simplify and cheapen the production of the end construction, to provide a mechanically strong end construction of good electrical conductivity, to insure physical contact between the connecting bar and the ends of the active material or material to become active and between the connecting bar and the ends of the tubes or envelops notwithstanding inequalities in the lengths of the tubes and active material or material to become active; to avoid empty spaces in the end construction; to provide for strengthening the ends of the tubes, and to accomplish the results hereinafter set forth.

In the accompanying drawings forming part hereof there is illustrated an embodiment of the invention chosen from other embodiments for the sake of description, and in the drawings, Figure 1, is a side view of a part of a plate or electrode embodying features of the invention.

Figure 4:
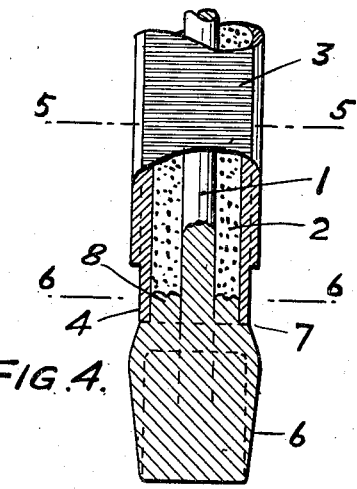
Figure 5:
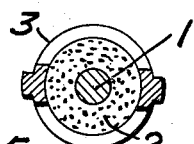
Figure 6:
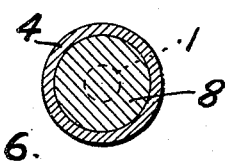

Fig. 4, is a transverse sectional view drawn to an enlarged scale and illustrating the end construction, and Figs. 5 and 6, are respectively sections on the lines 5—5 and 6—6, of Fig. 4.

In the drawings the plate or electrode includes metal rods 1, surrounded with active material or material adapted to become active 2, inclosed in ribbed and perforated or slotted insulating tubes or envelops 3. Such plates or electrodes are well known but the provision of an end construction for them has been a matter of expense and trouble and the result has left much to be desired. In one form of end construction use was made of a connecting bar having holes for receiving the ends of the rods 1, and having flanges around the holes for entering the ends of the tubes 3, and the ends of the rods were connected with the bar by puddling and burning. This involved casting the bar which was a difficult thing to do on account of the occurrence of blow holes and defective castings. Again the active material or material to become active did not extend equally far in each tube so that often the flanges on the bar did not reach it. Similarly the tubes were not of the same length so that some of them did not contact with the bar, necessitating trimming them to the same length. This, owing to the difficulty of making a complete circular cut practically prohibits the use of the imperforate cuff with its attendant advantages and in trimming a tube with slotted end results in breaking the tube and nicking the rod 1 with the saw. Furthermore, the end construction had spaces in it, was expensive and fussy to make, and was deficient in strength and conductivity.

According to the present invention an improved end construction is provided which obviates these and other defects and disadvantages and which will now be described.

Figure 1:
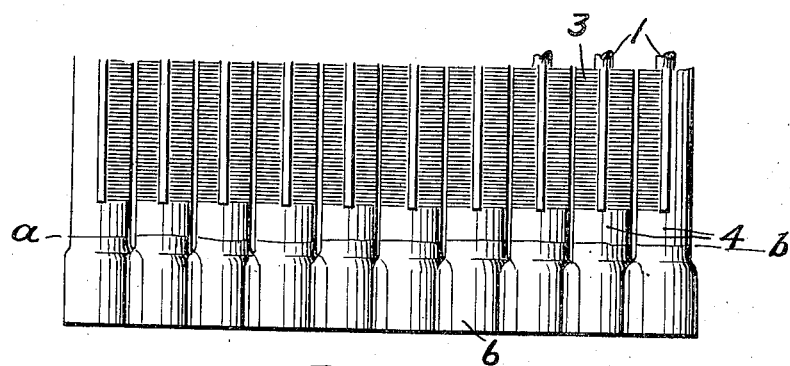
Figure 2:
Fig. 2, is a plan looking at the under side of the same.
Figure 3:
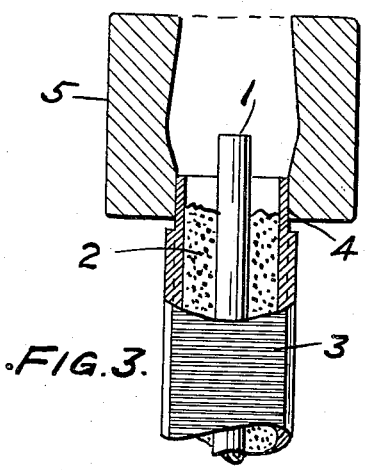
Fig. 3, is a sectional view illustrative of the end construction in the making.

4, are imperforate and smooth surfaced or ribless cuffs constituting the end portions or extensions of the tubes or envelops 3, and they are stronger than if they were slotted like the rest of the tube and they are well adapted to fit and make tight joint with circular openings in a mold 5, Fig. 3. 6, is a poured connecting bar fitting inequalities in the lengths of the tubes 3, and contacting with the ends of the cuffs as shown at 7, Fig. 4. Portions 8, of the bar 6, fill the ends of the cuffs and fit inequalities in the lengths of the ends of the active material or material to become active in the various tubes and contact with the ends of the active material or material to become active. Each cuff is inserted in a cylindrical cavity in a mold indicated at 5, and all these cavities are in communication and the ends of the rods 1, project into the cavities. The ends of the rods 1, may be uneven or at different levels and this is true of the ends of the active material or material to become active 2, and of the ends of the cuffs as shown along the line a—b, Fig. 1, but when metal is poured into the mold these inequalities are of no importance for the molten metal reaches the ends in the manner described and also merges into the ends of the rods 1, as is indicated by dotted lines in Fig. 4.

From the foregoing description it will be evident to those skilled in the art that the objects recited as well as other valuable results are accomplished by the invention.

We claim:

In a storage battery plate or electrode, including metal rods surrounded with active material or material adapted to become active inclosed in ribbed and perforated insulating tubes or envelops, and in combination therewith an end construction consisting of imperforate and ribless cuffs at the ends of the tubes and a poured connecting bar fitting inequalities in the lengths of the tubes and fitting inequalities in the ends of the active material or material adapted to become active and contacting therewith, and said bar merging into the ends of said rods, substantially as described.

EDWARD WANTON SMITH.
C. D. GALLOWAY.
CORNELIUS AMBRUSTER.